(12) United States Patent
Kelly

(10) Patent No.: US 7,997,438 B2
(45) Date of Patent: Aug. 16, 2011

(54) BUFFET SERVER WITH INSERTABLE-REMOVABLE DIVIDERS

(76) Inventor: Rosa Edmunds Kelly, Lakeland, FL (US)

( * ) Notice: Subject to any disclaimer, the term of this patent is extended or adjusted under 35 U.S.C. 154(b) by 461 days.

(21) Appl. No.: 11/523,721

(22) Filed: Sep. 19, 2006

(65) Prior Publication Data
US 2007/0062958 A1    Mar. 22, 2007

Related U.S. Application Data

(60) Provisional application No. 60/719,056, filed on Sep. 21, 2005.

(51) Int. Cl.
*B65D 1/24* (2006.01)
(52) U.S. Cl. ......... 220/533; 220/575; 220/532; 220/524
(58) Field of Classification Search .................. 220/575, 220/533, 524, 528, 532
See application file for complete search history.

(56) References Cited

U.S. PATENT DOCUMENTS

| | | | | |
|---|---|---|---|---|
| 2,081,078 A | * | 5/1937 | Watson | 126/373.1 |
| 2,610,759 A | * | 9/1952 | Slade | 220/533 |
| 4,735,318 A | * | 4/1988 | Keffeler | 206/532 |
| 5,027,972 A | * | 7/1991 | Bartholomew | 220/526 |
| 5,116,240 A | | 5/1992 | Wischhusen et al. | |
| 5,806,708 A | * | 9/1998 | Schwab | 220/552 |
| 5,921,423 A | | 7/1999 | Howell et al. | |
| 5,938,064 A | * | 8/1999 | Smith, Jr. | 220/475 |
| 6,039,202 A | * | 3/2000 | Olstad et al. | 220/533 |
| 6,116,456 A | * | 9/2000 | Davis | 220/636 |
| 6,209,346 B1 | * | 4/2001 | Frosch | 62/457.7 |
| D477,915 S | | 8/2003 | Slight | |
| 6,629,620 B1 | * | 10/2003 | Freeman | 220/23.88 |
| 6,966,450 B2 | * | 11/2005 | Askew | 220/529 |
| 7,004,323 B1 | * | 2/2006 | Symonds | 206/542 |
| 7,044,424 B2 | * | 5/2006 | Robertson et al. | 248/311.2 |

* cited by examiner

*Primary Examiner* — Anthony Stashick
*Assistant Examiner* — Christopher B McKinley

(57) ABSTRACT

An elongated container tapered inward and rounded on both ends. The recessed interior is segmented by five recessed slots, spaced at three inch intervals. The anti-shifting bar and lock notches creates' the locking system when the buffet server is place in support stand, there by stopping the buffet server from shifting front to back or sliding side to side while cradle in the support stand. The insertable-removable dividers, containers and sectional lids provides for a variety of set up weather mixing or matching keeping your liquid and solids separated if need be. The tabs and sockets, along with push button mechanism allows the buffet server to be taken apart and easily put together again for usage, storage or ease of shipping and handling.

1 Claim, 17 Drawing Sheets

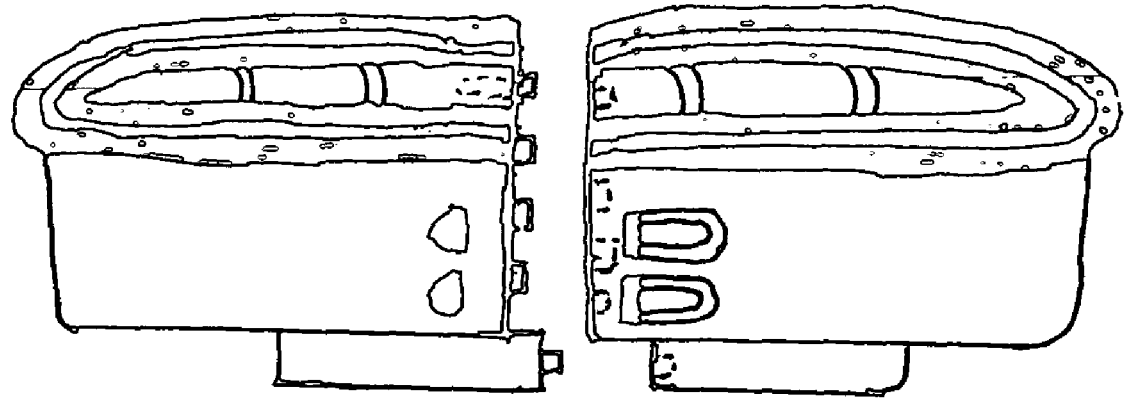
No. 1　　　No. 2
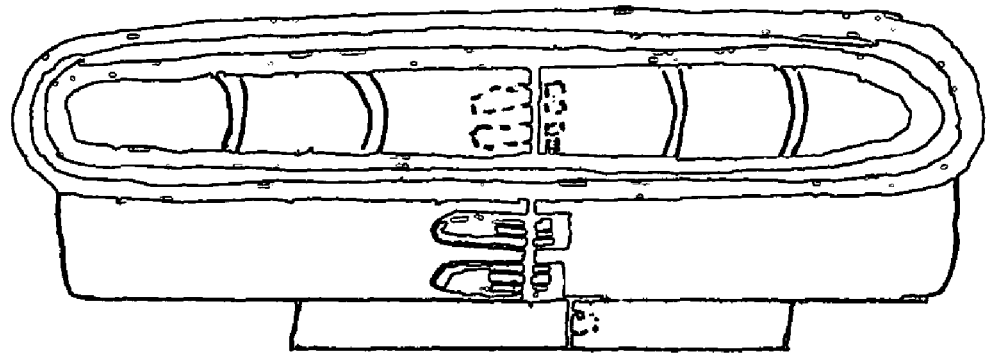
No. 3
Fig 38

BUFFET SERVER WITH INSERTABLE-REMOVABLE DIVIDERS

CROSS-REFERENCE TO RELATED APPLICATIONS

This application claims the benefit of provisional patent application Ser. No. 60/719,056, filed 2005 Sep. 21 by the present inventor.

FEDERALLY SPONSORED RESEARCH

Not Applicable

SEQUENCE LISTING OR PROGRAM

Not Applicable

BACKGROUND OF THE INVENTION

1. Field of Invention

This invention generally relates to serving platters, specifically to buffet servers.

2. Prior Art

Previously:

Several references were uncovered in the prior art patent search by Gold Stein Law Office, P.C. he is a registered Patent attorney, registration no. 36, 527.

these did not provide all that my invention, buffet server with insertable-removable dividers provide.

Example one: U.S. Pat. No. 5,921,423
Inventor: Harold R. Howell, Alford D. Miskimen
Invented: Stackable Reusable Food Delivery Trays for simultaneously serving hot and cold food.

But, their invention was made to be stainable trays so as to serve such who are confined to a hospital bed, nursing home or incarceration, that's great in and of its' self, however my said invention was invented for buffet style serving.

Therefore, a lot of people can be served using just one of said invention, opposed to their invention, although multiple serving, but only to and for one person at a time.

Also Mr. Howell and Mr. Miskimens' pre-cut and cavity enclosures are permanently set in place you can not remove and place them were you want.

with my invention, buffet server with investable removable-dividers you have a choice you're not stuck with any one particular form or setup.

Example two: U.S. Pat. No. 5,116,240
Inventor: Heiner Wischhusen; Hans Kehlbeck
Invented: Multiple Portion Food Storage and Multiple serving Apparatus.

Here again stainable trays system but with lids for each container while inside the two tray lids. The trays containers are formed to hold extra servings and can be removed and stored in the refrigerator which is also good, but, still, they are stainable trays, you would need quite a number of individual trays to serve a family or a gathering of people, think of the cleanup and the cost of all those trays.

My invention, buffet server with insertable-removable dividers, has a container and lids. To provide easy setup indoors or outside for hot and cold foods for instants, if you are wanting to serve cold foods and want to keep said foods chilled, you do so by placing said foods in provided food containers, then place an empty one of said food containers right up against the container of food you want to keep chilled you then fill the empty said container with ice which, by the way you may very well, already planned to provide ice anyway, because of the get together, so therefore, having to provide ice is not a huge undertaking.

You then place one of said dividers in the recessed slot, that is right next to the one filled food container of ice, to insulate and separate the cold foods. Food containers are also heat resistant and their lids also, so that hot foods will not melt said containers, and the insertable-removable dividers provide extra support for said containers.

Example three: U.S. Pat. No. 6,209,346 B 1
Inventor: David C. Frosch
Invented: The Tailgate Picnic Device This is a great invention for tailgate, camping out. I like this one a lot, you can even keep it in your vehicle if you like, but here again, I must stress the fact that it's' still permanently formed. You can not adjust the form setup to fit the need size of your gathering.

Example four: U.S. Design Pat. No. D477,915
Inventor: Peter T. Slight
Invented: Tray This is a unique design for a tray especially if you want to display something like snacks or knick knacks etc. but once again its' not designed to serve food to a lot of people at one time, and yes its' form is pre-set and unchangeable.

Example Five:
U.S. Pat. No. 2,081,078
Issue Date May 18, 1937
Current U.S. Class: 126/373.1; 220/533; 249/131
Current International Class: A21B 3/00 (20060101); A21B 3/13 (20060101)
Inventor: Watson M. Alice
Invented: Heated Tray My buffet server doesn't use electrical heat, foods are kept hot by the thickness of the materials that the sever is made from.

Example Six:
U.S. Pat. No. 2,610,759
Issue Date Sep. 16, 1952
Current U.S. Class: 220/533; 312/308
Inventor: Slade
Invented: Plural partition receptacle My buffet server has investable and remunerate divider panels the uniqueness of the lids.

Example Seven:
U.S. Pat. No. 5,806,708
Inventor: Schwab, John Sep. 15, 1998
Invention: Pressure tight travel container A pressure tight travel case for airline passengers for use in the unpressurized baggage compartment Of an aircraft which provides miscellaneous toiletry items with protection against both temperature and pressure variations which might cause spillage of the toiletries' contents, and which includes conveniences commonly found in other types of conventional travel containers.

My buffet sever is crafted to serve food and Mr John Schwab was created to pressurizing Toiletry bags for an airplane.

Example Eight:
U.S. Pat. No. 5,938,064
Inventor: Smith, Jr. Ronald G. Aug. 17, 1999
Invention: Storage box for scaffolds A new storage box for scaffolds for securing between vertical supports of a scaffold. The inventive device includes a box portion having a rectangular configuration. The box portion has an open upper end, a closed lower end, a pair of long opposed side walls, and a pair of short opposed end malls. The box portion includes a lid hinged secured to an upper rear edge thereof for selectively covering the open upper end. Two sets of prongs are secured to exterior surfaces of the pair of short opposed end walls of the box portion. The prongs are vertically oriented with a channel fc/rlzzed there between. The channels are dimensioned fez' engaging vertical support poles of a scaffold.

My buffet server is design to provide a strategic way of server food.

Example Nine:
U.S. Pat. No. 6,039,202
Inventor: Olstad, et al. Mar. 21, 2000
Invention: Cooler insert system A cooler insert system that includes an open-sided, main frame structure including an end wall and two opposed side walls, the end wall and the two opposed side walls each having an opening formed there through the two opposed side walls having three pairs of divider screen guide channels', a snap fit, hinged frame panel that is simultaneously snap fittable to an end of each of the two opposed sidewalls of the frame structure to form an open topped box with the main frame structure', three divider screens, each divider screen being investable into one pair of the three pairs of divider screen guide channels of the main frame structure to divide the interior of the main frame structure into compartments; and a number of stainable trays that are position within a compartment formed by one of the divider screens, each stainable tray having a holding cavity defined therein that is accessible through an access opening and a lower registration protrusion extending from the bottom thereof; the registration protrusion being sized and shaped to sealing fit into the access opening of a holding cavity of another tray member and to seal the access opening into the holding cavity.

My buffet server is not solely design to keep foods cool, its' main purpose is to server food. This cooler's main purpose is to be a box for handling ice.

Example Ten:
U.S. Pat. No. 6,116,456
Inventor: Davis, Roberts J. Sep. 12, 2000
Invention: Insulated food box construction An insulated food box construction 10 comprising a receptacle unit 11 including a reinforced generally rectangular receptacle member 20 having an open top, a closul'e unit 12 including a pair of transparent lid panels 40 hinged connected to the receptacle member 20 and dimensioned to overlie the open top of the receptacle member 20. Each of the lid panels 40 are provided with a pair of "stay open/stay closed" support arms and a support unit 13 including a pair of pivoted support legs $0 Operatively associated with the receptacle member 20 for elevating the receptacle member 20 to a serving height during use.

Example Eleven:
U.S. Pat. No. 6,209,346
Inventor: Frosch Apr. 3, 2001
Invented: Tailgate picnic device A picnic tailgate device includes a housing with a lid hinged connected thereto. The housing is internally divided into a plurality of zones including an insulated zone for supporting food-containing containers therein and maintaining the containers in a warm condition. The housing further has a cool compartment for supporting a plurality of food-containing containers in a chilled condition, the cool housing including an enclosed ice-containing chamber for meltingly supporting the food containers thereby maintaining the cool temperature of the chilled foods. Preferably a handle attached to a side of the device for carrying purposes and, optionally included, are legs for supporting the device during use.

My buffet server is designed to be compact and personal so you have all the comfort without the bulkiness.

Example Twelve:
U.S. Pat. No. 6,629,620
Inventor: Freeman, Christine A. Oct. 7, 2003
Invention: Food service receptacle A food service receptacle suited for storing and protecting a variety of prepared food items using efficient and manageable containers to allow easy and efficient food transfer. One embodiment includes a box, a closure unit, specialized containers and support members. The box can be lined with a watertight material such as plastic or galvanized metal. The closure unit is hinged mounted to said box and has openings covered by a netting material and also has a plurality of collapsible support arms to support an open position. The support members can be detachable and covered with a non-corrosive material at their bottom.

My buffet server doesn't use gas tanks or cylinders to heat up food because you just put you fresh cook while still hot and it will keep hot for a good while with the custom made lids in place.

Example Thirteen:
U.S. Pat. No. 6,966,450
Inventor: Askew, Stacy W. Nov. 22, 2005
Invention: Partitioned ice chest A partitioned ice chest including an insulated box with a bottom wall and an open top. Front, back and opposed side malls extend upwardly from the bottom wall. A removable lid closes the open top. Vertical slots are provided in the side walls. A partition can be oriented vertically or horizontally within the box. Tabs extending from the partition are slid ably positioned within the slots to prevent the partition from sliding about.

My buffet server is for serving food not for storing ice.

Example Fourteen:
U.S. Pat. No. 7,004,323
Inventor: Symonds' Theresa H. Feb. 28, 2006
Invention: Lunch box with divider structure A lunch box includes a housing that has top and bottom surfaces. The housing further has sidewalls integral with the bottom surface and preferably extending upwardly there from. Support members are secured to the plurality of sidewalls. The divider plates are removable attachable to the support members. A divider bar is slid ably position able into corresponding slots on the divider plates. The divider bar also has slots formed along a length thereof. Divider members have a plurality of slots formed therein for selectively engaging the divider bar. The divider bar and the plurality of divider members advantageously cooperate with each Other for maintaining food products during transportation. The lunch box further has a zipper for attaching the top surface to the housing. A flexible handle is also connected to the housing.

My buffet server is made for serving more than one person.

Example Fifteen
U.S. Pat. No. 7,044,424
Inventor: Robertson, et al. May 16, 2006
Invented: Article holder for a barrel cooler An article holder for a barrel cooler has a lip for fitting on the top end of the barrel sidewall and a tray attached to the lip for holding containers which indicate the contents of the barrel.

My buffet server has a groove to aid the lids to stay in place. Even if you're catering or own a catering business, my buffet server with insertable-removable dividers is designed to help make your setup and cleanup more easier, a product that afford food hygiene, convenience, and functionality which help makes it easier to organize and host a successful picnic, family get to gather or catering events both small and large.

OBJECTS: I have invented buffet server with insertable-removable dividers to: Provide insertable-removable dividers, and insertable-removable food containers, and three pc. sectional lids, a human can use to serve food using said invention to a gathering of people, not just one or two and at the same time help limit food exposure to the environment.

ADVANTAGE: Because of the insertable-removable dividers my said buffet server can go from one to six meals, all in one container, just by adding or removing said dividers. It also brakes down for easy storage when not in use with the push of two buttons.

DRAWINGS

Figures

FIG. 1 is a three dimensional view of sectional lid no. one
FIG. 2 is a three dimensional view of sectional lid no. two.
FIG. 3 is a three dimensional view of sectional lid no. three.
FIG. 4 is a three dimensional view of buffet server.
FIG. 5 is a three dimensional view of support stand.
FIG. 6 is a two dimensional view of insertable-removable dividers.
FIG. 7 is a three dimensional view of middle food container insert.
FIG. 7A is a top view of food containers lids.
FIG. 8 is a side view of end food containers.
FIG. 9 is a top inside view of end food containers.
FIG. 10 is an end view of one of two end lids.
FIG. 10 is a view of one of four sealed end of lids.
FIG. 11 end view of buffet server.
FIG. 12 is a front view of one of two center support beams.
FIG. 13 is a front view of one of two end support beams.
FIG. 14 is an assembled view of buffet server.
FIG. 15 is a close-up side view of buffet server before joining the two halves together.

DRAWINGS

Figures of Alternative Embodiment

FIG. 16 is a view of four pc. sectional lid.
FIG. 17 is a view of two pc. sectional lid.
FIG. 18 is a view of three pc. Screen sectional lid.
FIG. 19 is a view of one pc. lid.
FIG. 20 is a view of six pc. sectional lid.
FIG. 21 is a view of 12 slot buffet server.
FIG. 22 is a view of fold-able stand on wheels.
FIG. 23 is a view of fold-able stand.
FIG. 24 is a view of full length food container.
FIG. 25 is a view of two pc. food containers.
FIG. 26 is a view of three pc. food containers.
FIG. 27 is a view of four pc. food containers.
FIG. 28 is a view of mini-version of the large buffet server.
FIG. 29 is a view of a cart with wood and metal accompaniment structure on wheels.
FIG. 30 is a view of wood buffet server and support stand.
FIG. 31 is a view of a electrical and ceramic buffet server.
FIG. 32 is a view of ceramic and stainless steel buffet server with stainless steel support stand.
FIG. 33 is a view of a crystal buffet server.
FIG. 34 is a view of a plastic buffet server.
FIG. 35 is a view of a coming ware buffet server.
FIG. 36 is a view of a china buffet server.
FIG. 37 is a view of a stainless steel buffet server, lids, dividers, food containers, and support stand.
FIG. 38 is a view of a buffet server that separates and closes using buckles as fastener.

DRAWING

Reference Numerals 1 lid no. one
2 lid no. two
3 lid no. three
4 buffet server
5 support stand
6 insertable-removable divider
6A a top view of one of five dividers food container lid
7 food container
7A food container lid
20 food placement area
22 lock notch
30 lid groove
40 recessed slot
50 sterling silver trim
60 sealed end
70 extended rim
80 handle
93 latch
93A rivet bra socket bra push button mechanism
94 tab
96 anti-shifting bar
200 center support beam end support beam
300 side plank

DETAILED DESCRIPTION

FIG. 1.15 Preferred Embodiment

A preferred embodiment of my present invention buffet server with insertable-removable dividers is illustrated in FIGS. 1-15 starting with FIG. 1 is a view of lid no. 1 made of tempered glass, elongated shaped, approximately 195.2 mm×292.8×73.2 mm with a black solid handle 80. The sealed end 60 is only 61 mm high, because it doesn't go all the way down like the extended rim 70 does. The sterling silver trim 50 is applied to all the edges.

FIG. 2 is a view of lid no. 2 made of tempered glass, elongate shaped, approximately 195.2 mm×292.8 mm×73.2 mm with a black solid handle 80 and two sealed ends 60. But the sealed end 60 is only 61 mm high, because they don't go all the way down like the extended rim 70 does. The sterling silver trim 50 is applied to alt the edges.

FIG. 3 is a view of lid no. 3 made of tempered glass, elongate shaped, approximately 195.2 mm×292.8 mm×73.21 mm because it doesn't go all the way down like the extended rim 70 does. The sterling silver trim 50 is applied to all the edges.

FIG. 4 Buffet server 4 is tapered inward and rounded on both ends and is approximately 610 mm×341.6 mm×170.8 mm, this includes the 24.4 mm thickness as well. The inside of buffet server 4 is segmented by five recessed slots 40 that are 24.4 mm. wide and 12.2 mm deep and go from one side to the side at 73.2 mm intervals. These recessed slots 40 separate the food areas 20. In the top of the rim of buffet server 4 is the lid groove 30, this groove keeps lids 1, 2 and 3 from easily sliding off buffet server. At the base of the buffet server 4 is the anti-shifting bar 96 approximately 388 mm×48.8 mm×24.4 mm. Buffet server 4 will be manufactured in two halves for now, both halves will consist of approximately 12.2 mm×12.2 mm×12.2 mm tabs 94A and the second half will consist of approximately 12.3 mm×12.3 mm×12.3 mm sockets bra in this way the joining of the two halves will stay aligned and the latch 93 and push button mechanism 93A will hold the two said halves together. The rivets 93B will hold the latch 93 in place.

FIG. 5 is the support stand 5 measuring 439.21u111× 292.8111111×146.4 mm which consist of two side planks 300, two end support beams 100 and two center support beam 200 having two lock notches 22 measuring 48.8 mm×48.8 mm×48.8 mm one on each center support beam 200. The support stands 5 measures approximately 292.8 mm×292.8 mm×146.2 mm.

FIG. 6 is a view of the insertable-removable divider 6 each one is approximately 317.2 mm×24.2 mm×207.41-141 mm also each insertable-removable divider 6 is of the same half of a circle pattern and the rectangular top view ha is a top view of 1 of 6 of the insertable-removable divider 6.

FIG. 7 is a view of 4 of 4 of the middle food containers 7. Said food container are available in two sizes approximately 292.8 mm×73.2 mm×195.2 is small and medium size is 292.8 mm×146.4 mm×195. mm and they have the same half a circle pattern as well.

Each one is approximately 292.8 mm×73.2 mm×195.2 mm.

Figure 10:
FIG. 10 is an end view of one of the two outer lids 1 and 3.
Figure 10A:

FIG. 10A is a view of one of four sealed end 60 on the lids 1, 2 and 3 the extended rim 70 is approximately 12.2 mm×6.1 mm.

Figure 11:
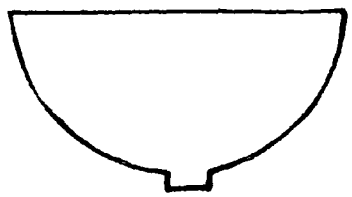

FIG. 11 a view of one of two ends of buffet server 4.

Figure 12:
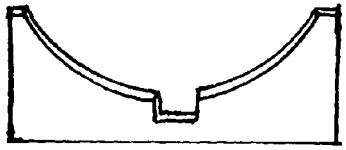

FIG. 12 is a view of one of two center support beam 22 approximately 450.8 mm×24.4 mm 146.4 mm.

Figure 13:

FIG. 13 is a view of one of two outer support beams 100 measuring approximately 439.2 mm×24.4 mm×146.4 mm.

Figure 14:
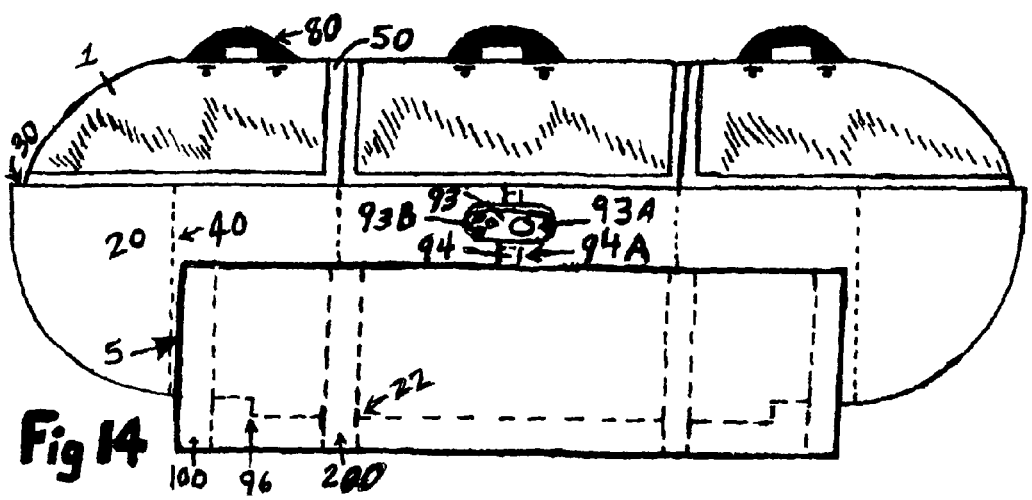
Figure 15:
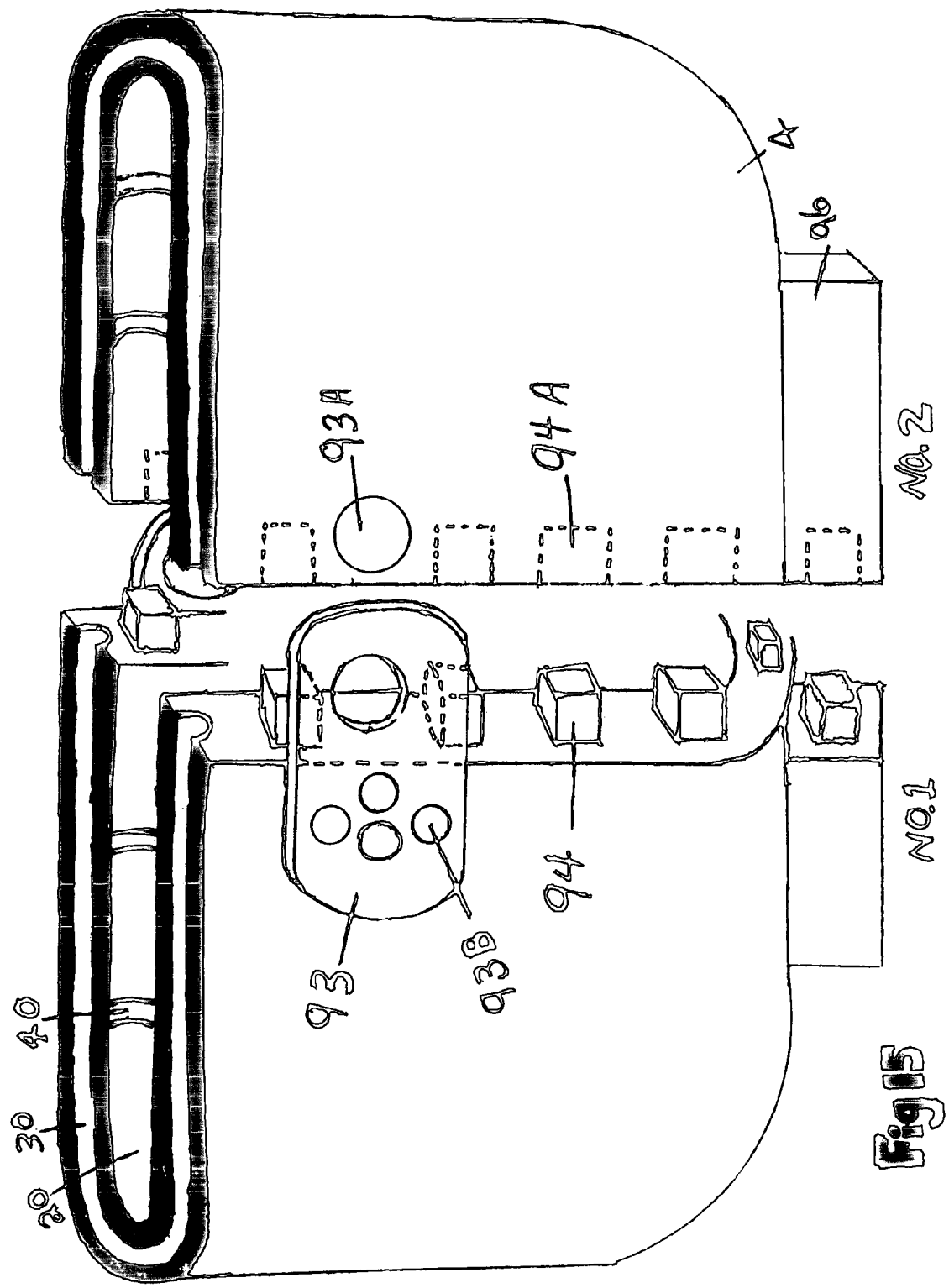

FIG. 14 is an assembled one dimensional view from the outside of buffet server 4. The parts that are shown are the food placement areas 20, lids groove 30, recessed slots 40, sterling silver trim 50, handles 80, latch 93, push button mechanism 931, rivets 93B, tabs 94, sockets 94A, anti-shifting bar 96, center support beam 200, support stand three piece sectional lid 1, 2 and 3. FIG. 15 is a close-up view of buffet which shows the approximately position of tabs 94 and sockets 94A. Said tabs are on No. 1 along with latch 93, and rivets 93B. Said sockets 94A are on No. 2 along with push button mechanism 94A. Food areas 20, lids groove 30, recessed slots 40, anti-shifting bar 96 and buffet server 4.

OPERATION

Preferred Embodiment—FIGS

Figure 1:
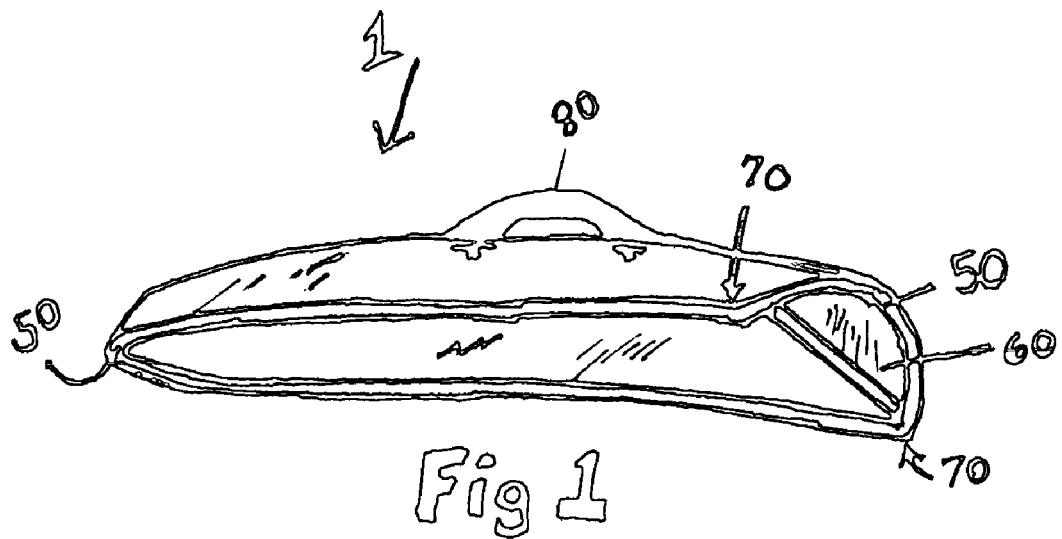
Figure 2:
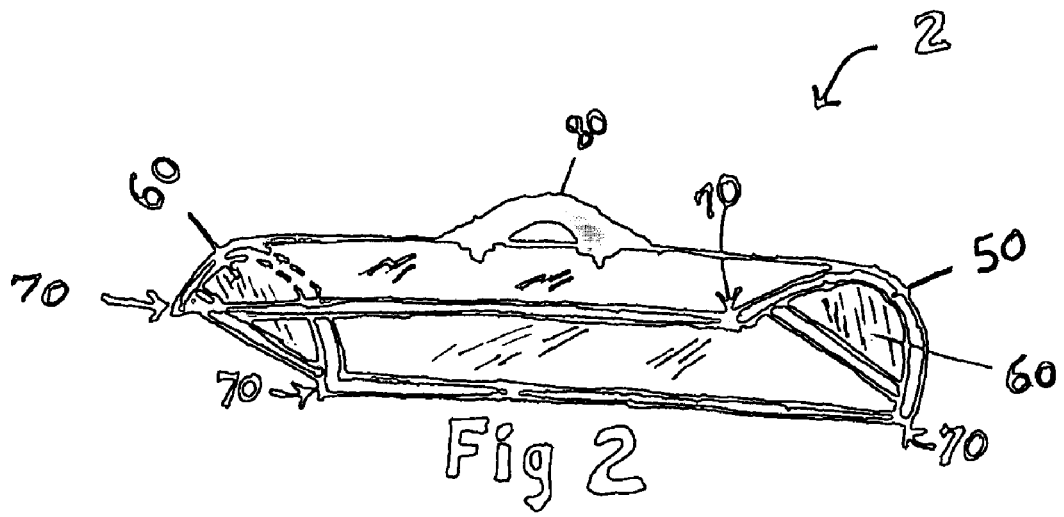
Figure 3:
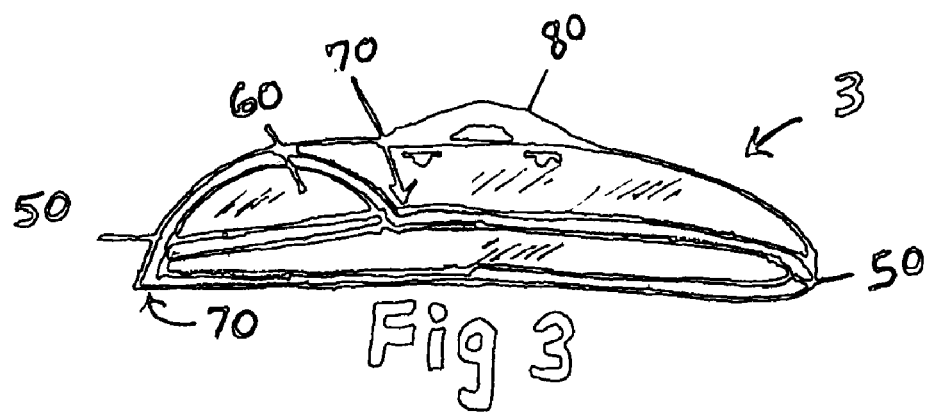
Figure 4:
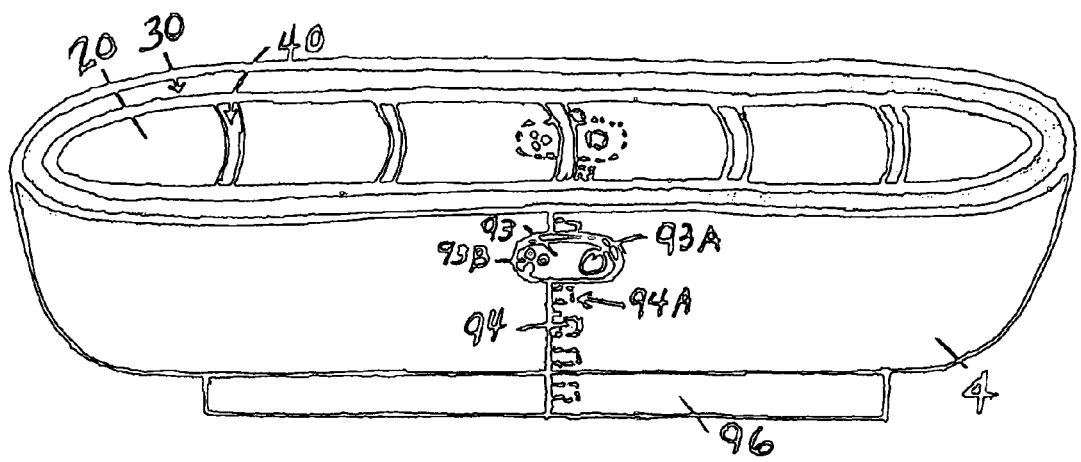
Figure 5:
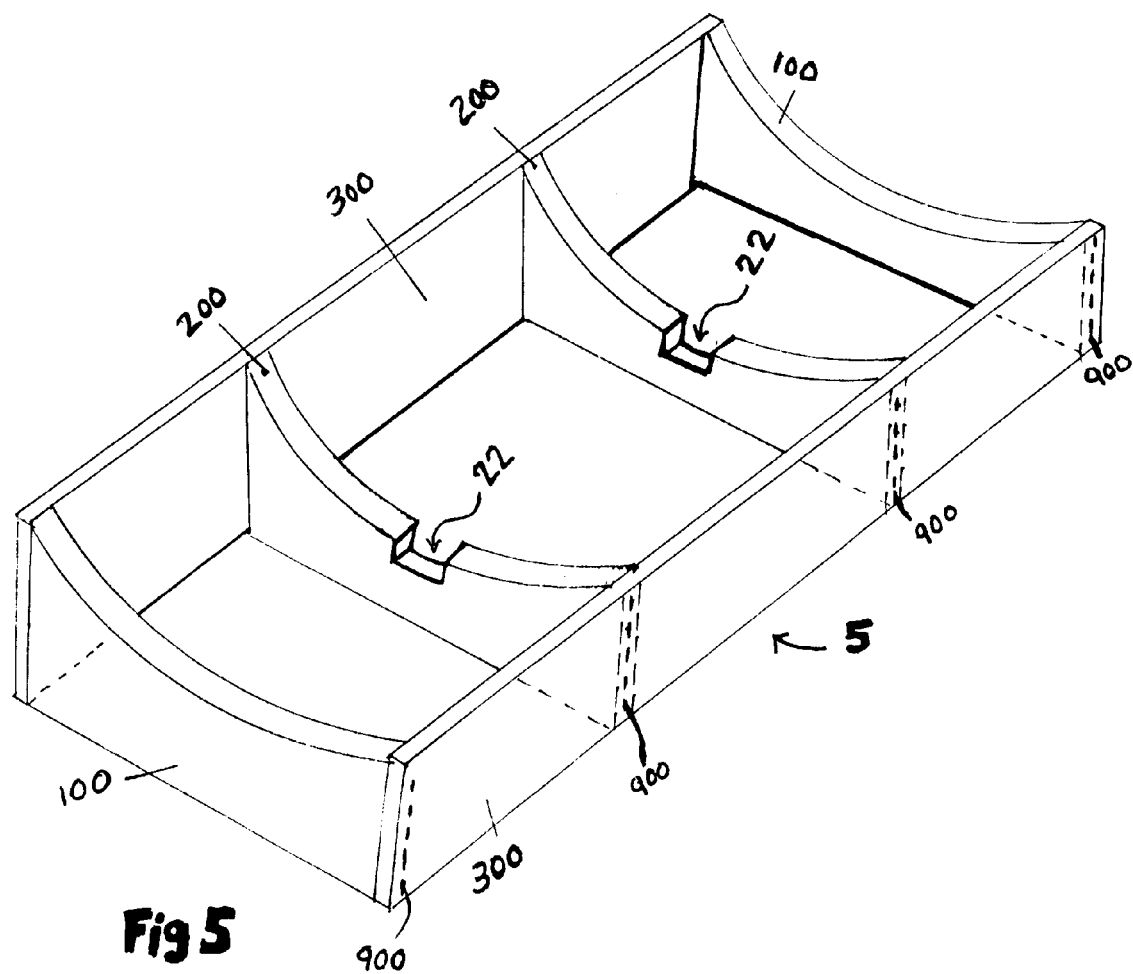
Figure 6:
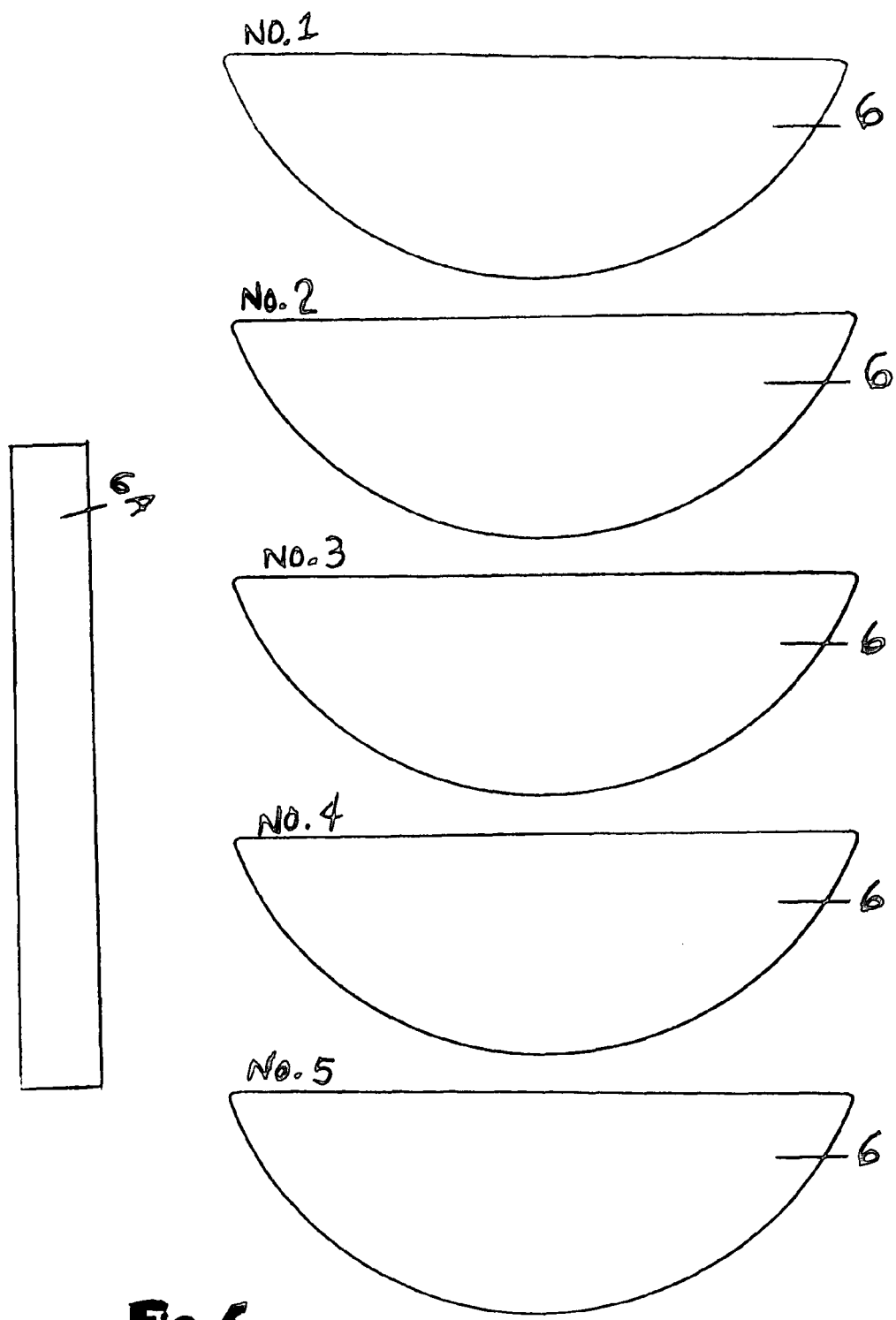
Figure 7:
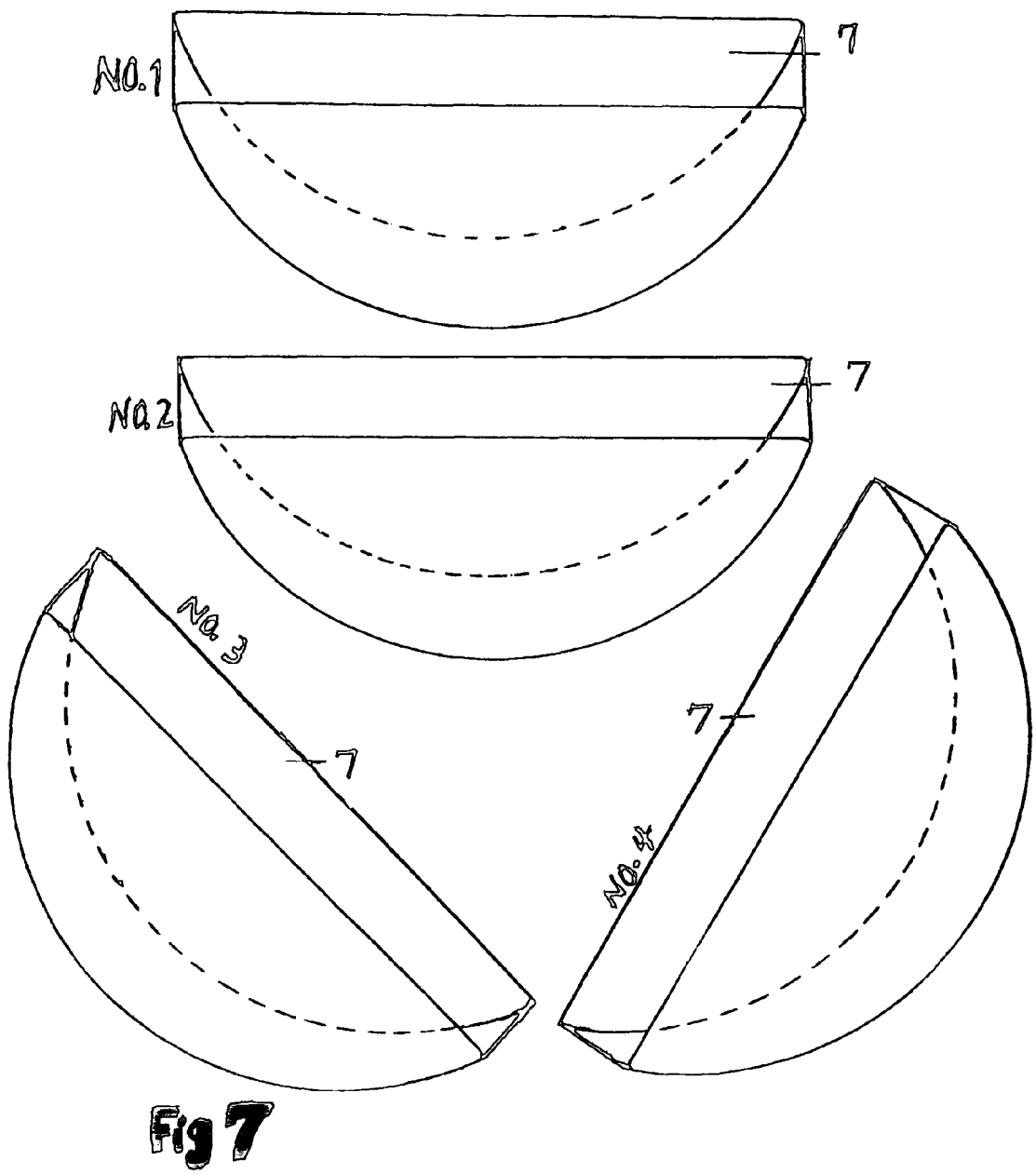
Figure 8:
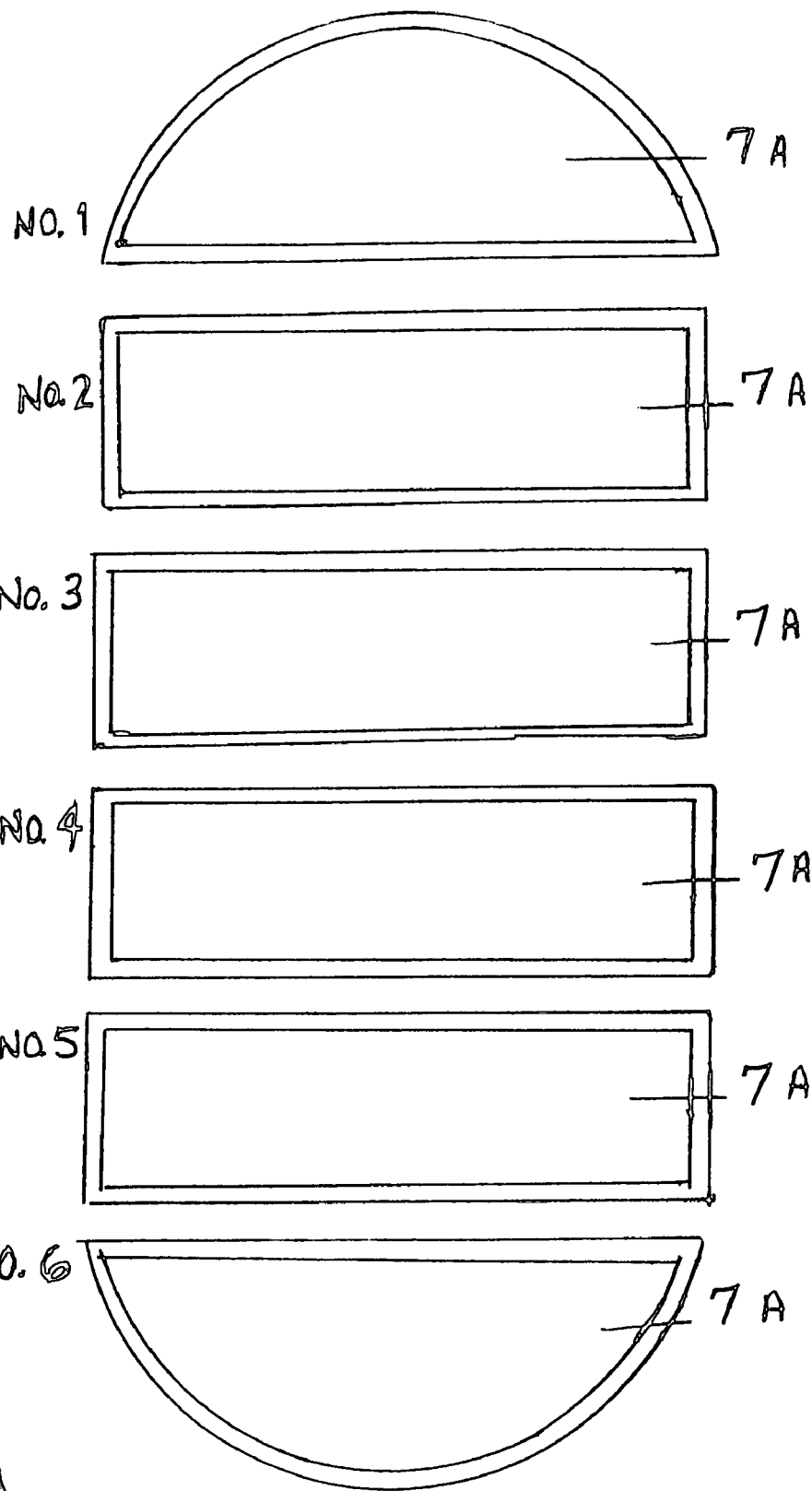
FIG. 8 is an upright view of the 2 of 2 end food containers 7 the outer wall is rounded and the inter wall straight and they're exchangeable.
Figure 9:
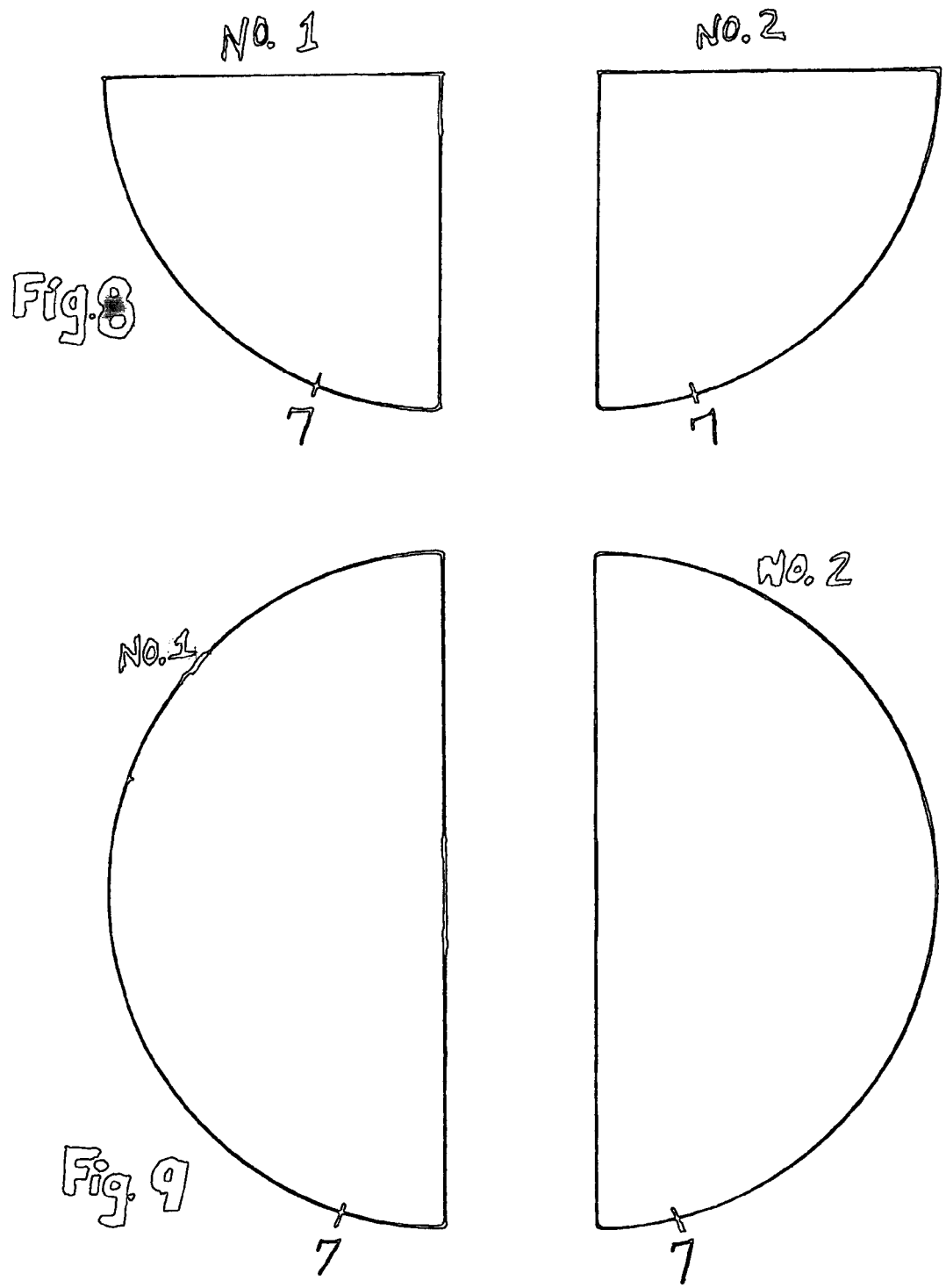
FIG. 9 is an inside view of the 2 of 2 end food container 7.

The buffet server 4 in FIG. 4, 14, 15 operates with your choices of food texture, temperature and amount, by using insertable-removable dividers 6 in FIG. 6 and insertable-removable, heat resistant food container 7 in FIGS. 7, 8, and 9 and three piece tempered glass sectional lids 1, 2 and 3 in FIG. 1, 2, 3, 10, 10A, 14 and tabs 94, socket 94A, latch 93 with rivets 93B and push button mechanism 94A in FIGS. 4, 14, and 15.

Food textures: if your choice of food is dry or none liquids, you do not have to use the food containers 7 in FIGS. 7, 8, and 9 because your foods are not wet or runny they will not interfere with other foods unless mu just choose to do so. To keep dry foods separated from wet foods you use the food containers 7 in FIGS. 7, 8, and 9 to hold the liquids in place.

Food temperature hot: if your choice of foods are hot no matter liquids or solids just use the heat resistant food containers 7 in FIGS. 7, 8, and 9, even hot dry foods sweat out liquids, this will keep the dry hot foods from running into other foods. You just insert one of insertable-removable divider 6 in FIG. 6 into recessed slots 40 in FIGS. 4, 14, and 15 next to the container of hot food; this will also keep the hot container of food even more sturdy because the container 7 in FIG. 7, 8, 9 will not melt when used respectfully.

Food temperature cold: if your choice of food is cool or chilled just place the foods you want to keep cold in one of the food containers 7 in FIGS. 7, 8, and 9 place it in the food area 20 in FIGS. 4, 14 and 15 of your choice, you then place another food container 7 in FIGS. 7, 8, and 9 fill it with ice then place the ice filled container 7 right up against the foods mu want to keep cold or chilled you then place an insertable-removable divider 6 in FIG. 6 into recessed slots 40 in FIGS. 4, 14, and 15 right up against the container of ice, this will insulate the ice so it will last longer. You normally have ice handy at a gathering of people so it is not a gigantic under taking to have to provide ice. Insertable removable dividers: the dividers 6 in FIG. 6 gives you multiple ways for setting up the food placement areas 20 in FIGS. 4, 14, and 15 by placing them in the recessed slots 40 in FIG. 4, 14 anils for supporting the food containers 7 in FIGS. 7,8, and 9. The one inch thickness of the dividers 6 in FIG. 6 helps keep the food at the temperature you like. Use the container lids 7A in FIG. 7A to seal foods in containers 7 in FIGS. 7,8 and 9 if you so desire extra food coverage. Three-piece sectional glass lids: the lids 1, 2 and 3 in FIGS. 1, 2, 3, 10, 10A and 14 work because they are sealed on all inter ends 60 in FIGS. 1, 2, 3, 10, 11, and 14 so when you by choice lift up one lid at a time, that will be the only food areas 20 in FIGS. 4 and 11 exposed to flies, airborne particles and germs, at your choice the rest will be covered. The lids 1, 2 and 3 in FIGS. 1, 2, 3, 10, 10A and 14 fits down in 12.2 mm wide and 12.2 mm deep groove 30 in FIGS. 4, 14 and 15 that's cut in the top of buffet servers 4 rim in FIGS. 4, 14, and 15 to help prevent said lids from easily sliding off accidentally once they' in place in FIGS. 4, 14 and 15 also the said groove 30 in FIG. 4, ligand 15 helps prevent flies and other insects from crawling so easily under lids 1, 2 and 3 in FIGS. 4, 14 and 15 Amount: the heat resistant food containers inserts 7 in FIGS. 7, 8, and 9 will provide two available sizes: 73.2 mm wide and the food containers for your preference. The food containers 7 in FIGS. 7, 8, and 9 all have lids 7A in FIG. 7 for them that way your foods are even more protected if need extra coverage. Tabs 94 in FIGS. 4, 14 and 15 are placed inside of sockets 94A in FIGS. 4, 14 and 15 this will keep the two halves of buffet server 4 in FIGS. 4, 14 and 15 aligned once they are clicked in place by the latch 93 in FIGS. 4, 14 and 15 that is held in place using rivets 93B in FIGS. 4, 14 and 15. The push button mechanism 94A in FIGS. 4, 14 and 15 works to hold the two halves of said buffet server 4 together once they've been clicked them into place.

DESCRIPTION AND OPERATION OF ALTERNATIVE EMBODIMENTS

Figure 16:
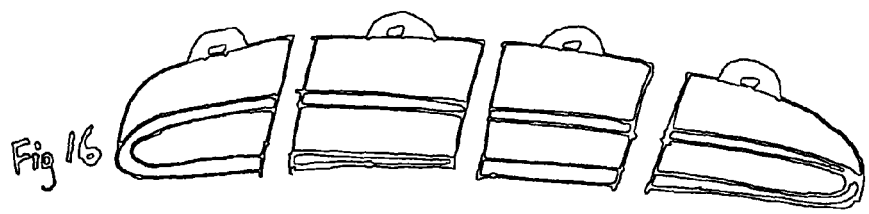
Figure 17:
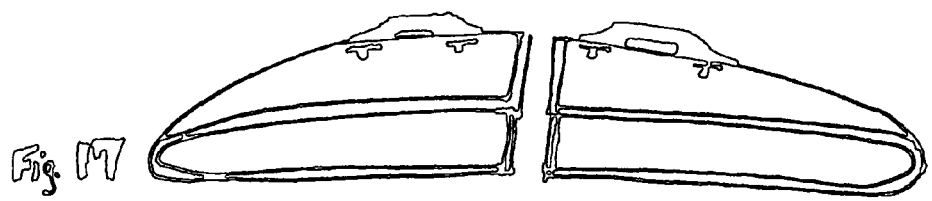

FIG. 16 a set of four tempered glass sectional lids.
Operation lift one lid at a time to help keep out flies.
FIG. 17 a set of two tempered glass lids.
Operation lift one lid a time to help keep out flies.

Figure 18:
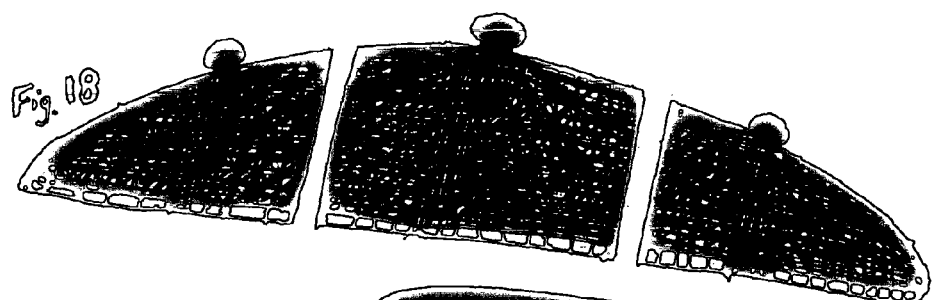
Figure 19:
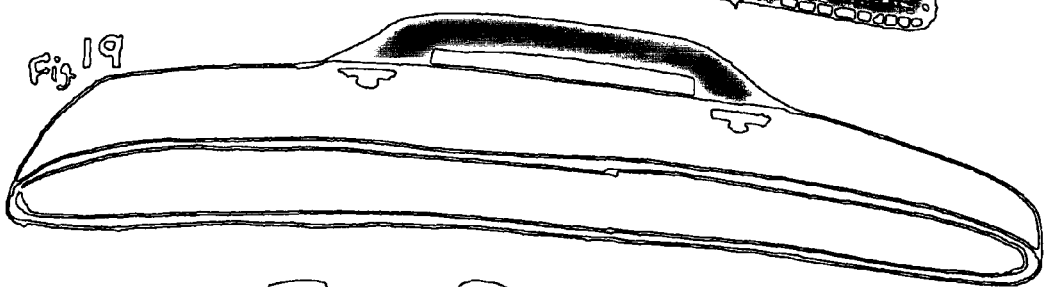
Figure 20:
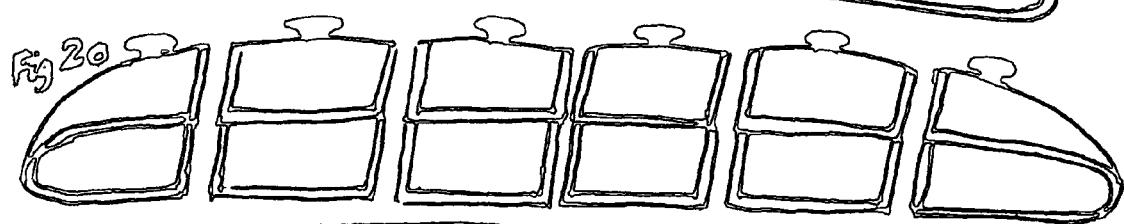
Figure 21:
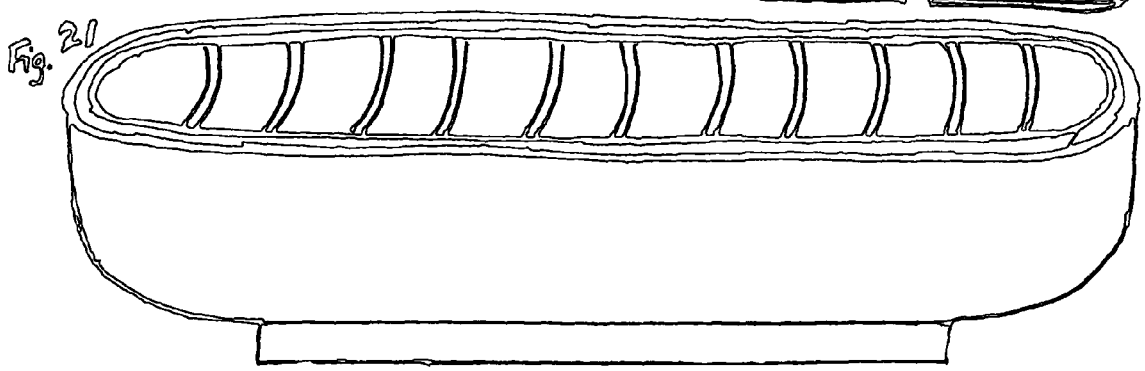
Figure 22:
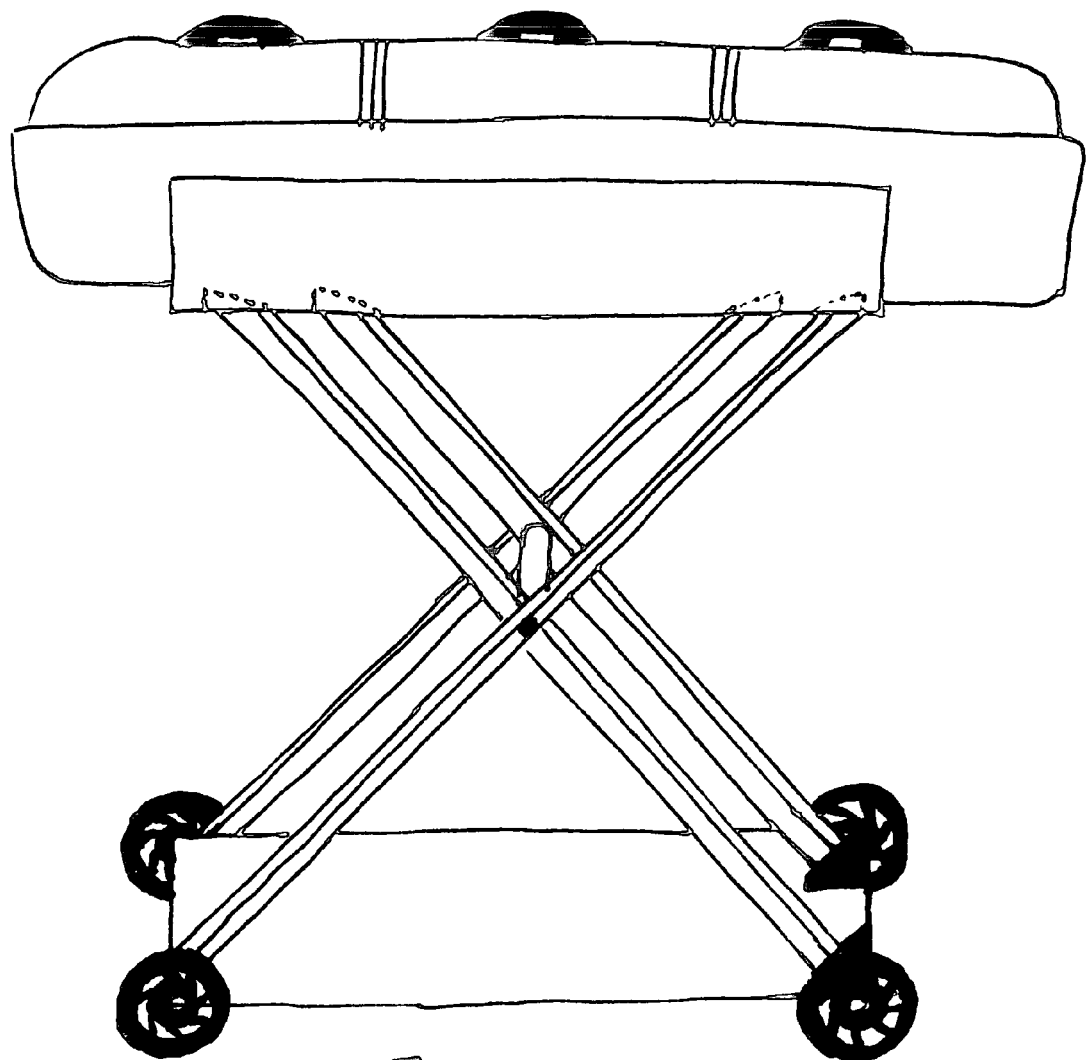
Figure 23:
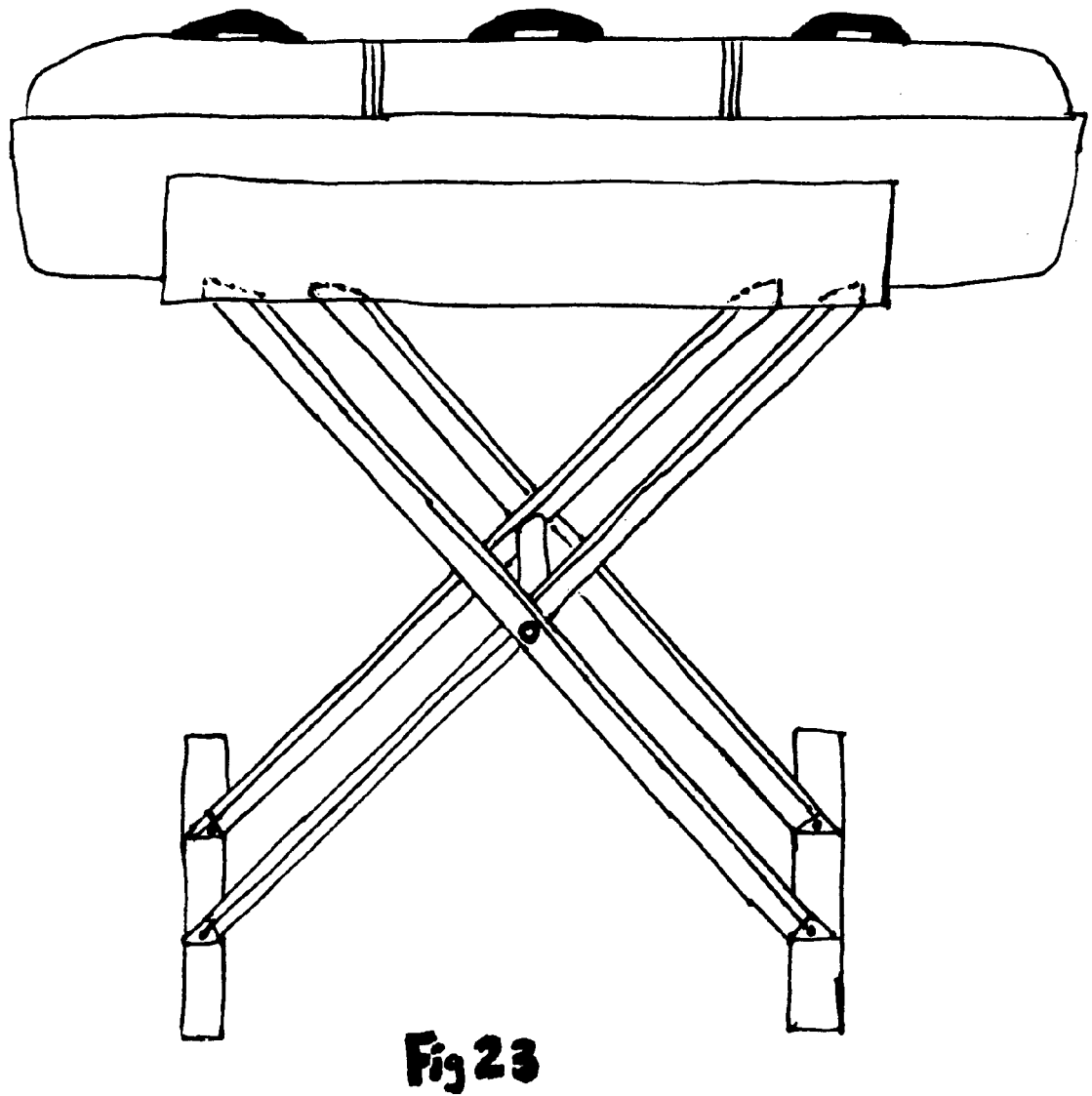
Figure 24:
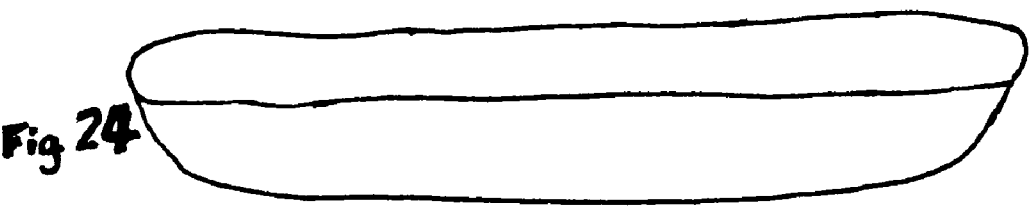
Figure 25:
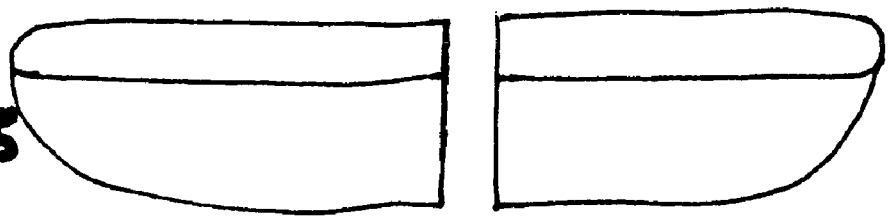
Figure 26:
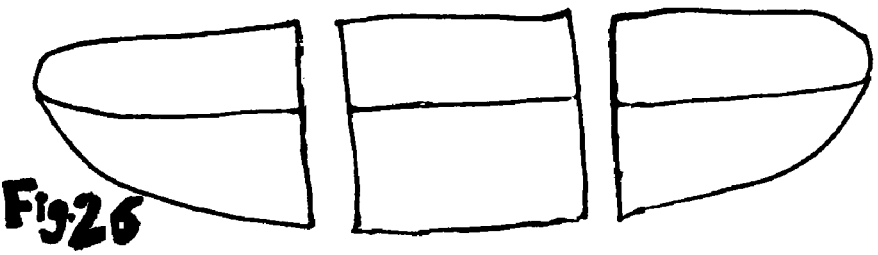
Figure 27:
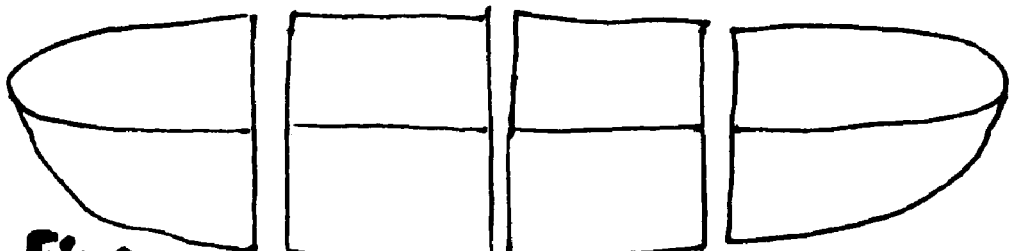
Figure 28:
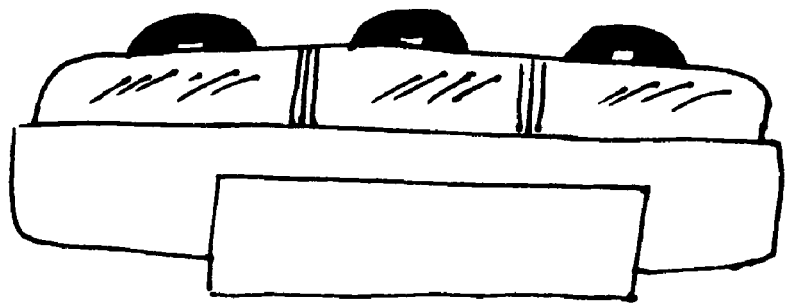
Figure 29:
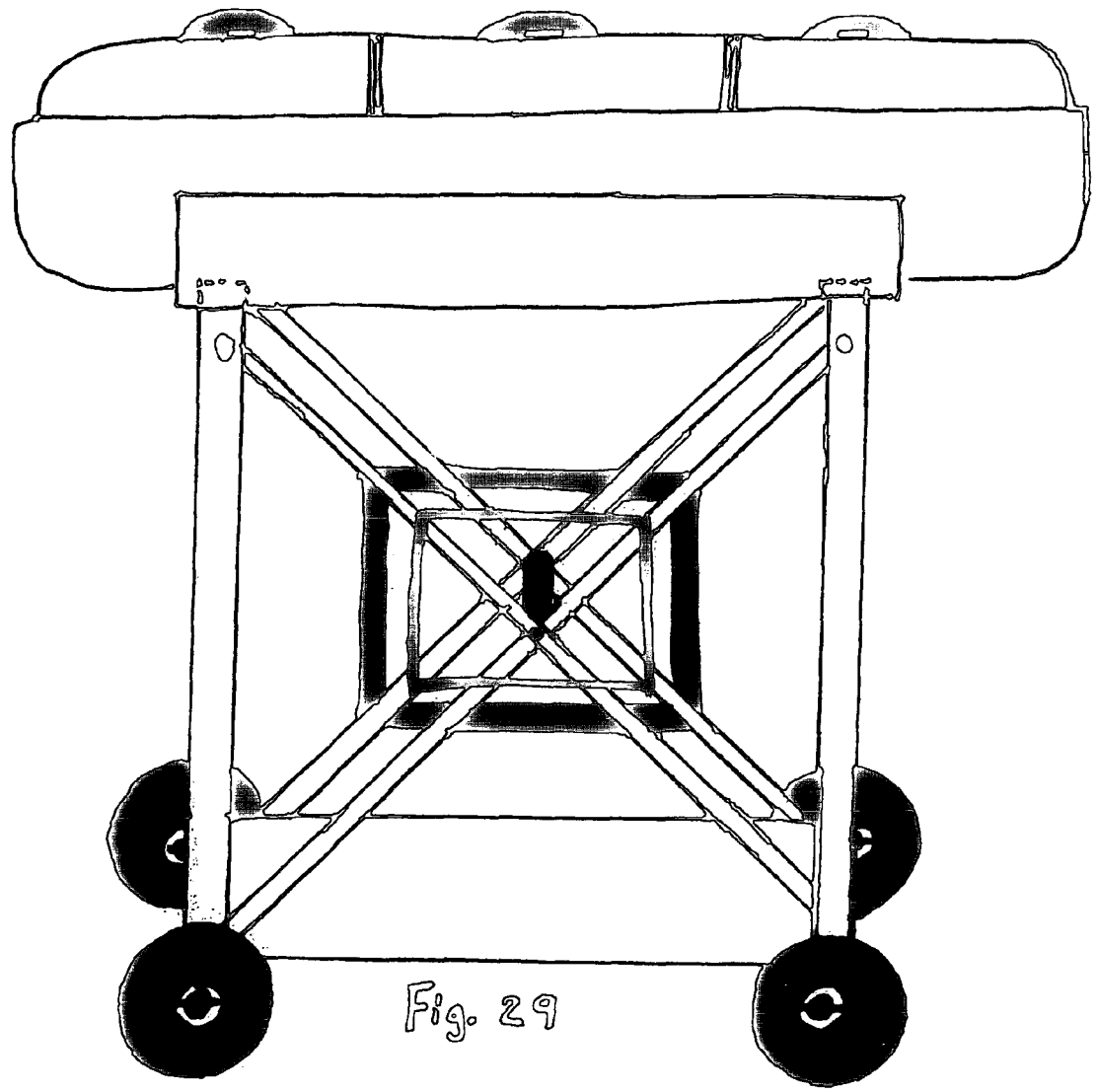
Figure 30:
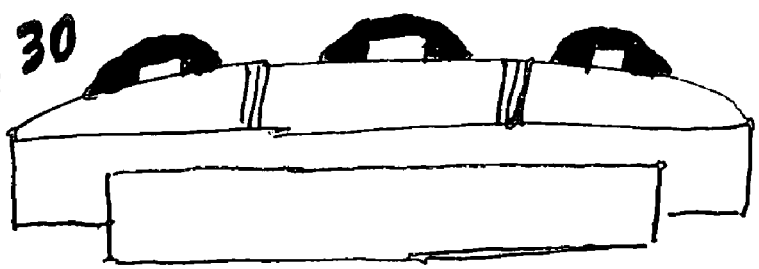
Figure 31:
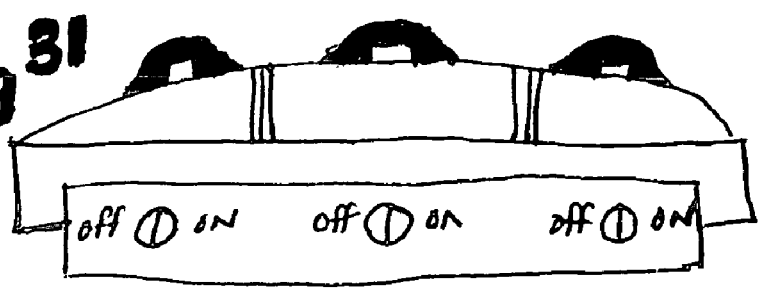
Figure 32:
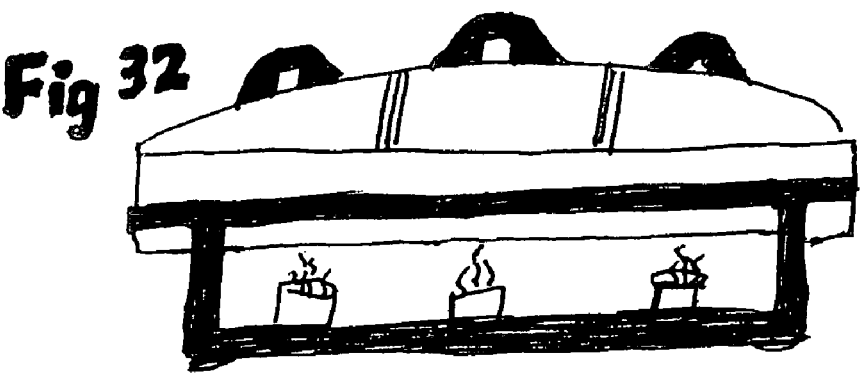
Figure 33:
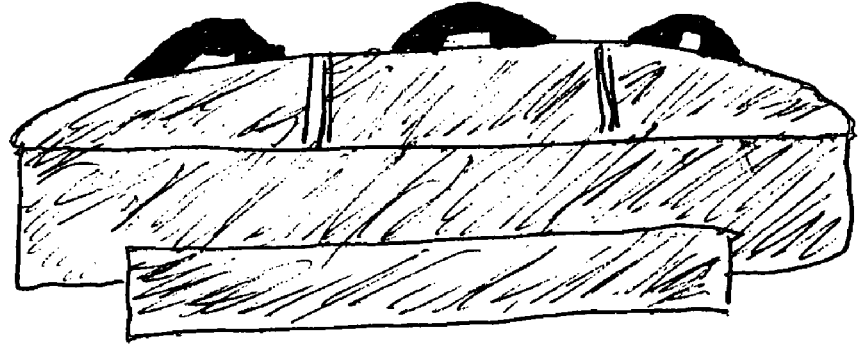
Figure 34:
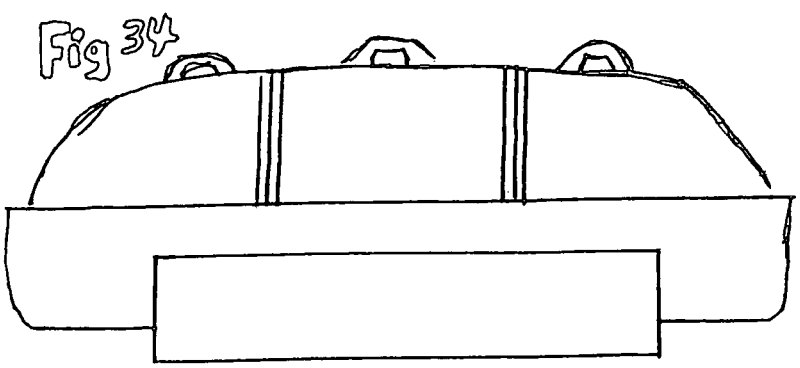
Figure 35:
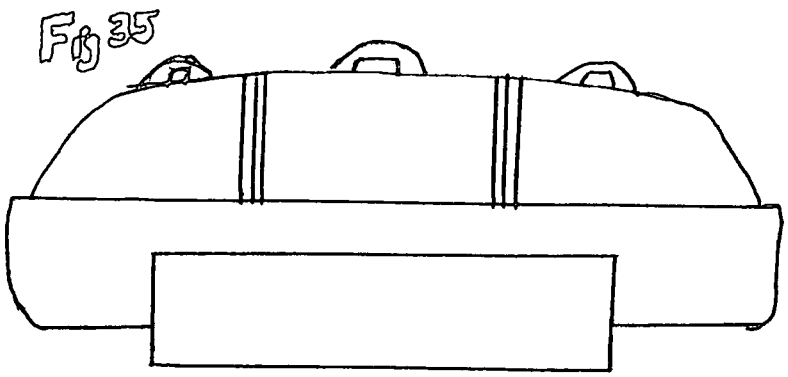
Figure 36:
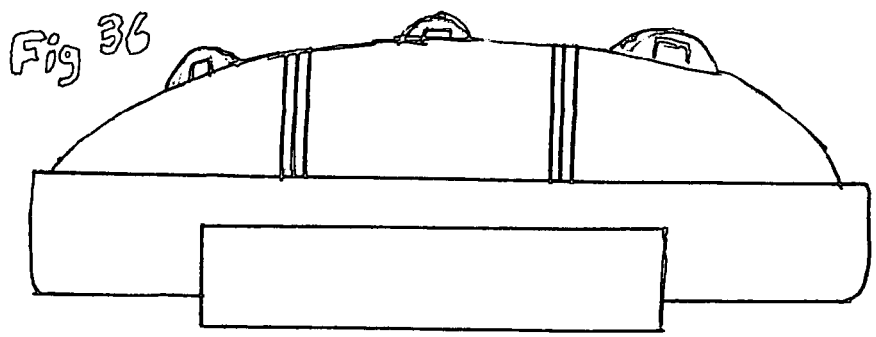
Figure 37:
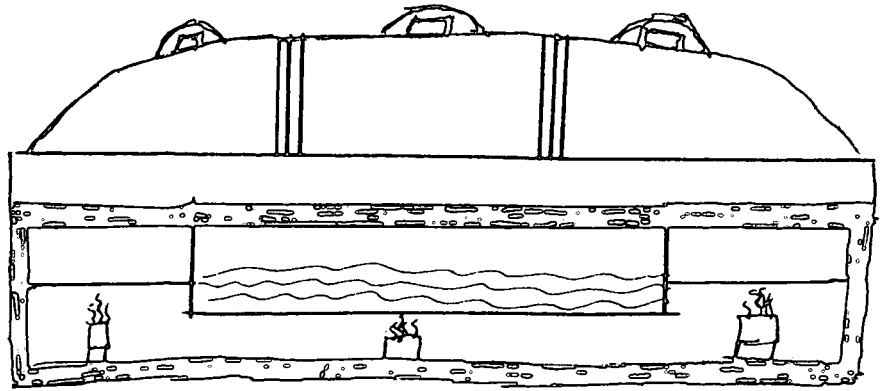

FIG. 18 a set of three netted lids to help foods that needs air to breath with freedom and to limit flies access to foods while foods are breathing.
Ex: to help keep breads dry without total exposure to flies.
Operation: place netted lid on foods that needs to breath.
FIG. 19 one lid that cover entire buffet server.
Operation: to cover food that requires only one big lid.
FIG. 20 a set of six sectional lids to cover each food placement areas or to fit a large buffet server.
Operation: lift one lid at a time to help keep out flies.
FIG. 21 approximately four or five feet in length buffet server, with approximately twelve food placement areas.
Operation; place food in areas of your choice.
FIG. 22 a fold-able stand on wheels for buffet server.
Operation: unfold and lock stand into position, then place the buffet server support stand in position top of the carts' legs then place said buffet server in position on the support stand.
FIG. 23 another foldable stand for buffet server.
Operation: unfold and place said support stand on top fold-able stand the place
FIG. 24 is a full length heat resistant food container that lines the full interior length of buffet server.
Operation: insert into said buffet server food placement areas.
FIG. 25 is two equal in size heat resistant food containers that line the full interior length of this buffet server
Operation: insert into buffet server food placement areas.
FIG. 26 is three equal size heat resistant food containers that line the full interior length of this buffet server.
FIG. 27 is four equal in size heat resistant food containers that line the full interior length of said buffet server.
Operation: insert into said buffet server food placement areas.
FIG. 28 is a mini-version of the larger buffet server.
Operation: can be used as table dispenser for condiments, nuts, dinner mints, honey, syrups etc. . . .
FIG. 29 is a cart with wood metal accompaniments structure
Operation: place buffet server support stand on top of cart s' legs then place buffet serve in stand buffet server in position on support stand.
FIG. 30 a wood buffet server and support stand is made out of wood with tempered or plastic three piece sectional lids.
FIG. 31 an electrical and ceramic buffet server the interior of buffet server is metro from ceramic. The exterior of this electrical buffet server is made of a type of metal tin with three off and on buttons and lids made of plastic or glass. The electricity is built directly into stand only; it doesn't run through the ceramic. Operation place your foods in ceramic buffet server then plug in the power cord set the control knobs to your liking. FIG. 32 ceramic and stainless steel buffet server with stainless steel support stand. Operation: place ceramic server inside of the stainless steel steam pan with the stainless support stand made for using fuel from cans and potable gas tanks whatever you prefer.
FIG. 33 is a crystal buffet server it is made from crystal lots of different cuts and different colors, and shapes different styles.
FIG. 34 is made from plastic, many different styles, colors and shapes. This server and the stand is made from plastic.
FIG. 35 is made from corning ware again different colors shapes and styles.
FIG. 36 is made from china ware styles, shapes, and colors.
FIG. 37 is made of stainless steel the lids, dividers, food containers, stand handles also the support stands can be used for serving trays when they are not being used with the buffet server and the stands can be built into the buffet server if need be and all the buffet servers that can be cut in halves can also instead be increase or deceased in length just by adding or removing an extension leaf with tabs and sockets and the push button mechanism included on all extensions so that you can make the set-up as lengthy as you want. Wow! I like the extension leaf already. Also that would mean making extensions of the support stand as well as including the anti-shifting bar on the bottom of the extension leaf, by doing this you will be able to replace any part of the buffet server very, very easily this in return will generate more revenue, even long term revenue. FIG. 38 buffet server cut in half no. 1 and no. 2 but using two buckles to lock FIG. 38 not the two halves together. There are two buckles on each side of this server and anti-shifting bar is cut off center form a male and female cut. This style of cut allows the center weight of the server to be supported by the anti-shifting bar, now the center is three times more stronger.

ADVANTAGES

From the description above, a number of advantages of buffet server become evident: where by all the lids, recessed slots, heat resistant food containers, food placement areas, the support stand, whether you use the long or short version, it's buffet server that can truly accommodate and complement your buffet need, buffet server is a great improvement in the serving platter field.

CONCLUSION, RAMIFICATION, AND SCOPE

Conclusion

Accordingly the reader will see that said buffet server with inset-table-removable dividers, insertable-removable food containers, can make planning your next cook out, catering event, office party, church fellowship, family gathering, etc. . . . a success Furthermore, buffet server permits all said parts to be manufactured in a variety of colors, shapes, sizes, widths and materials to give the user more set up choices.

Although the description above contains much specificity, these should not be construed as limiting the scope of the invention but, merely providing illustrations of some of the recently preferred embodiments of this invention.

Ramifications

For example said buffet server can have other shapes, such as circular, oval, trapezoidal, triangular, etc. . . . , more insertable-removable dividers can be add and said dividers can be made thicker or thinner. The lid groove can be replaced by a different design on the lids so that said lids just fit down on the inside of said buffet server. Also can be design to look like persons, places, or things even animals.

Scope

Thus the scope of the said invention should be determined by the appended claims and their Legal equivalents, rather than by the examples given.

I claim:
1. A buffet server comprising:
an elongated and tapered inward container, wherein said container is aligned with recessed slots along an interior;
insertable-removable dividers to be placed into said recessed slots;

food placement areas positioned along the interior of said container;

wherein said container comprises two separate halves using tabs and sockets to align the two halves of said buffet server and latch and push button mechanisms to lock the alignment of the two halves of said buffet server back into position for usefulness again;

a support stand for said buffet server, wherein said support stand prevents said buffet server from shifting forwards or backwards once positioned into said support stand; said support stand having lock notches located on center support beams of said support stand, an anti-shifting bar which is located under a bottom of said buffet server, wherein said anti-shifting bar rests between the support beams once said buffet server is set into said support stand; and lids, wherein said lids are dome shaped and have sealed ends, said lids have an extended rim that fit into a deep groove in a rim of said container, said groove is cut into a top of the rim of said container, said groove keeps said lids from easily sliding off said buffet server once said lids are placed into said groove; and food containers that keep liquids from running into dry foods when necessary, wherein said food containers are heat resistant.

\* \* \* \* \*